Patented Feb. 21, 1939

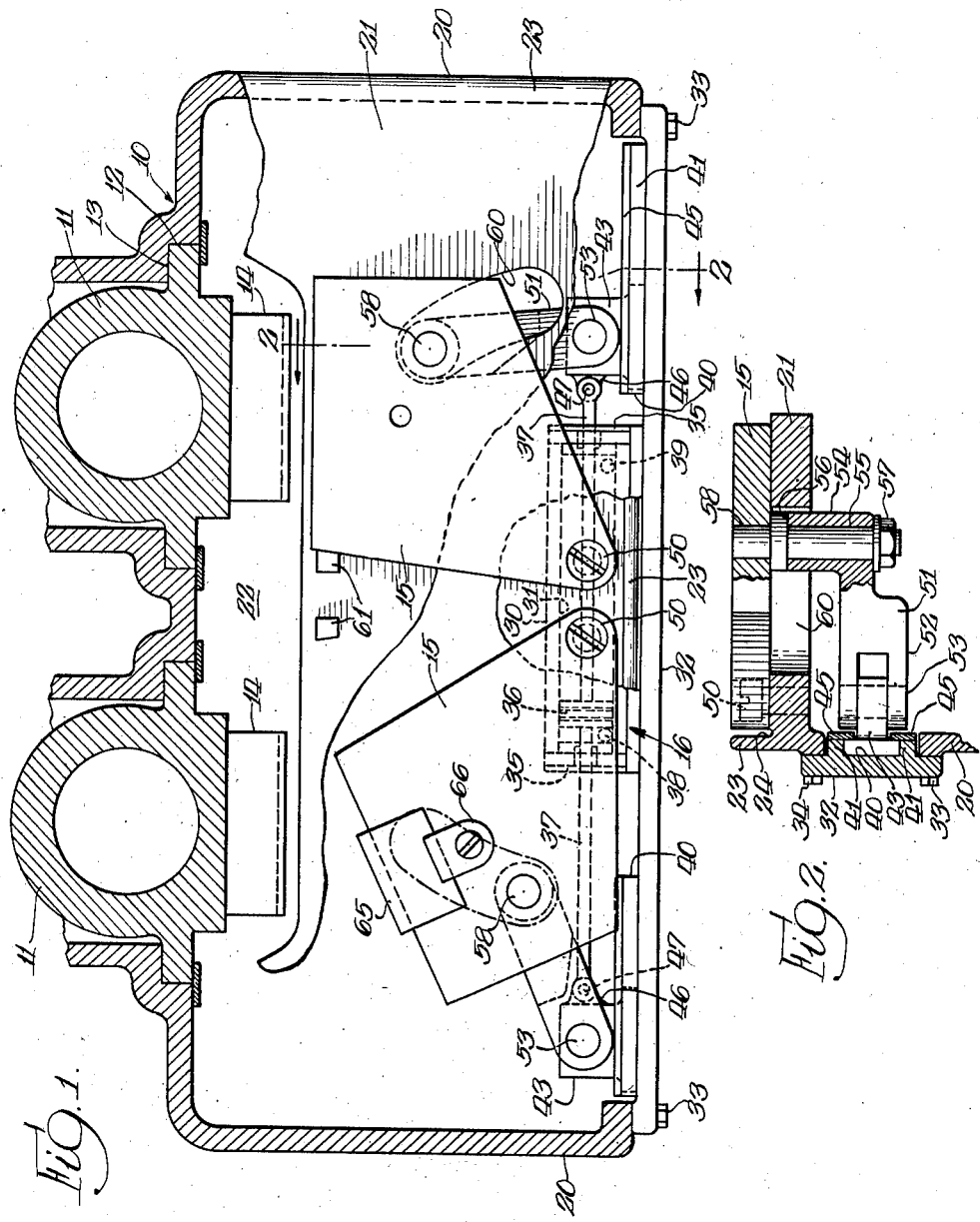

2,148,241

UNITED STATES PATENT OFFICE 2,148,241

BROACHING MACHINE

Francis J. Lapointe, Ann Arbor, Mich., assignor to Sundstrand Machine Tool Co., Rockford, Ill., a corporation of Illinois Application June 25, 1937, Serial No. 150,249

18 Claims. (Cl. 90—33)

This invention relates to broaching machines and particularly to a feeding mechanism therefor. One object of my invention is the provision of a new and improved means for moving a work supporting table from a loading position to a broaching position and removing it therefrom after the broaching operation.

Another object of my invention is the provision of a new and improved pivoted work table for a broaching machine operable to swing as a unit, away from the machine to a loading position and inwards toward the machine to a broaching position.

Still another object is the provision of a broaching machine equipped with a work table or plate slidably supported on the frame of the machine and pivotally connected thereto to enable a hydraulic feeding mechanism to translate the plate pivotally into a broaching position and then retract it from the broaching position to a loading position.

A further object is the provision of a feeding mechanism for a broaching machine operable to move a work plate between loading and unloading positions by employment of a system of levers in which the elements form the legs of a collapsible triangle, operable when erected to move the work plate to one position and when collapsed to move the work plate to another position.

A still further object is the provision of a work feeding mechanism for a duplex broaching machine provided with hydraulically operated, independently pivoted work plates slidably supported upon the frame of the machine, one of which is arranged to be moved into a working position while the other is moved into a loading position.

Other objects and advantages of the invention will become apparent as the description proceeds, taken in connection with the drawing which forms part of this specification.

In the drawing:

Fig. 1 shows a top view of the mechanism in a position occupied when mounted on a broaching machine;

Fig. 2 is a partly sectional view of the mechanism taken on line 2—2 of Fig. 1 looking in the direction of the arrows.

While I have shown in the drawing and will herein describe in detail the preferred embodiment of my invention, it is to be understood that I do not thereby intend to limit the invention to the specific form disclosed, but aim to cover all modifications and alternative constructions falling within the spirit and scope of the invention as expressed in the appended claims.

A duplex broaching machine has been chosen to illustrate the preferred embodiment of the invention. As herein disclosed, the broaching machine comprises two broach carrying rams mounted for alternate operation on a vertical frame. A pair of work plates are shown pivotally mounted on a portion of the frame and are provided with a hydraulic actuating device capable of moving one of the plates into position adjacent one of the rams, while the other plate is simultaneously translated to a loading position away from the other ram.

The duplex broaching machine chosen, consists of a column or frame 10 designed to support a pair of vertical broaching rams 11, which may be hydraulically operated, the rams being equipped with lateral slides 12 adapted to ride in guided ways 13 formed on the frame. Each of the rams in this embodiment is designed to carry a surface broach 14. Work supporting plates 15 are provided pivotally mounted upon the frame of the broaching machine and these are shown operated by a hydraulic mechanism indicated generally 16.

At the front of the frame on the side adjacent the broaches, a bracket 20 is cast integrally with the frame and this extends from the bottom of the machine upward to a convenient height. The bracket 20 forms the sides and ends of a box like closure at the front of the machine. Surmounting the bracket 20 there is provided a plate forming a horizontal shelf like table portion 21 which substantially covers the box like enclosure, with the exception of a space 22 immediately adjacent broaches 14. The shelf 21 has provided thereon an outer rim 23 extending completely around the outside edges and immediately inside the rim is a shallow groove 24 useful as a drainage for lubricants.

The hydraulic mechanism 16 previously referred to consists of a casing 30 forming the outside of a cylinder 31. The casing is secured by bolts or other means not shown to a removable plate 32 which in turn is mounted upon the bracket 20 by means of screws 33 securing it to the bracket itself and screws 34 securing the upper portion thereof to the front edge of the shelf 21. The ends of the cylinder 30 are tightly closed by caps 35. Slidably mounted within the cylinder 31 is a piston 36 capable of reciprocation back and forth in the cylinder carrying with it a rod 37 having sufficient length to extend outward at each end through the caps 35, which are provided with suitable packings to make a fluid tight, sliding fit for the rod. Hydraulic fluid, such as oil, is introduced during one stage of operation through a port 38 into one end of the cylinder 31, and at the same time, hydraulic fluid is discharged from the other end of the cylinder through a port 39. When it is desired to reverse the reciprocation, the port 39 is made an inlet port and the port 38 an outlet port by operation of a suitable valve of conventional design (not shown). The removable plate 32 has also formed thereon a pair of channels 40 formed by the parallel ribs 41 located on either side of the hydraulic cylinder.

Slidable in each of the channels 40 is a reciprocating element or shoe 43 having a somewhat T shape with the head of the T positioned within the channel 40. In order to hold the shoe in place there are provided strips 45 which are secured to the ribs 41 by some suitable means. The reciprocating element or shoe is thereby permitted to slide freely to and fro within the confines of the channel, but is prevented from being removed therefrom by the strips 45. There is provided on the leg of each T shaped shoe at the side adjacent the hydraulic cylinder a lug 46 which is connected by means of a pin 47 to the rod 37 extending from the cylinder. By this construction, the hydraulic cylinder takes the form of a motor for shifting the reciprocating elements alternately from side to side.

Work plates 15, previously referred to, are pivoted on the upper face of the table portion 21 by means of a screw 50 which pierces the plate at one corner. These plates have complementary shapes and are symmetrically arranged upon the shelf. One edge of each plate is straight and has such a direction relative to the pivot that when moved into broaching position, the edge is substantially parallel to the face of its respective broach 14.

Each of the tables is secured to its respective reciprocating element or shoe by means of a link 51, which acts as a columnar brace when the table is in a broaching position. The link as here shown has a bifurcated end 52, pivoted by means of a pin 53 to the shoe 43 and has an upward extending arm 54 which is pivotally attached to the work plate 15 by means of a pin 55. It will be noted that although the pin 55 is securely positioned within the arm 54, by means of a nut 57 and an annular shoulder 56 on the pin, it has also a straight cylindrical upper projection 58 forming the pivoted connection with the work plate but from which the work plate can be freed by merely being lifted upwards after removing the screw 50. When the hydraulic mechanism is operated alternately back and forth, the reciprocating elements or shoes are alternately shifted from one end to the other of their respective channels 40.

By analyzing the drawing, it will become evident that the pivot points, identified by the pins 50, 53 and 58 form the corners of a triangular supporting system having two legs of constant length and one leg of a variable length, the latter being the leg formed between the pins 50 and 53.

When the piston 36 is shifted from right to left, the length of the variable leg of the triangular system occupying the position at the right of the machine as viewed in Fig. 1 becomes shortened. The effect of this is in a sense to erect or elevate the triangular system thus described which results in its pin 58 being elevated, carrying with it the portion of the attached right hand work table 15 to which it is pivoted. Since one corner of the work plate is pivoted to the shelf by means of the pin 50 the path of travel of the pin 58 will be arcuate with respect to the pin 50. In order, therefore, that the pin 58 together with the arm 54 of the link 51 may be free to move in this arcuate path, there is provided an arcuate channel 60 formed in the shelf curved about the pin 50 as a center.

It will be noted that while the triangular system first described at the right side of the machine is being erected in order to shift its respective work plate into position adjacent one of the broaches, the other triangular system at the left is operated to withdraw the other work plate 15 from the other of the broaches 14 by reason of the fact that the second mentioned system is being collapsed due to a lengthening of the variable leg thereof. Alternate operation of the two may thus be maintained.

Stops 61 are provided on the shelf in order to determine exactly the position at which each work plate is stopped when moved into broaching position.

For illustrating the purpose of the device, there has been shown on one of the work plates a work piece 65 held thereon by means of a work fixture 66. When the device is in operation, one of the work plates is withdrawn to a position farthest away from its respective broach and the work piece to be broached is secured to it while in this position. Next, the hydraulic mechanism is shifted in the opposite direction, so that the work plate carrying the work piece is moved to a position adjacent its broach 14, the mechanism being so timed that as soon as the work piece is in position, the broach to which it is presented is moved downwardly to cut the surface. Meanwhile, the opposite work plate is withdrawn from the other broach in order that it may be loaded with a work piece to be subsequently presented to its broach, as soon as the broaching operation has been finished upon the first mentioned work piece.

There has thus been provided a semi-automatic hydraulic feeding mechanism for a duplex broaching machine so operable that when one of the pair of work supports or plates is being broached by one of a pair of broaches, the other is in a position withdrawn therefrom, preparatory to being loaded with a work piece for the next alternate broaching stroke.

I claim as my invention:

1. In a broaching machine having a broaching ram and a supporting frame therefor, a work feeding mechanism comprising a work supporting plate pivotally mounted upon the frame, means attached to the frame having a reciprocating member extending therefrom, a reciprocating element slidably secured to the frame connected with the reciprocating member and with the work supporting plate and operable thereby to communicate motion from the means to the work plate in order to pivot said work plate to and away from a broaching position.

2. In a broaching machine having a broaching ram and a supporting frame therefor, a work feeding mechanism comprising a work plate pivotally mounted upon the frame, a hydraulic motor attached to the frame having a reciprocating member extending therefrom, a track on the frame, an element slidable therein connected to the reciprocating member, and a link pivotally connected between the work plate and said element in order to translate the work plate to and away from the broaching ram in response to operation of the motor.

3. In a broaching machine having a broaching ram and a supporting frame therefor, a work feeding mechanism comprising a horizontal shelf member supported by the frame, a work plate pivotally mounted upon the shelf member and slidable over the surface of said member to present an edge of said plate to the broaching ram, a hydraulic motor attached to the frame comprising cylinder and piston elements, a rod attached to one of said elements, there being provided a track on the frame having a shoe slidable therein connected to the rod, and a link having one end pivotally attached to the work plate and another end pivotally attached to the shoe for swinging said plate to and away from the broaching ram in response to operation of the motor.

4. In a broaching machine having a broaching member and supporting frame therefor, a bracket on the frame and a shelf supported thereby, the combination of a work feeding mechanism comprising a work plate pivotally mounted near an edge thereof upon the shelf and slidable over the surface of said shelf to present an edge of said work plate to the broaching member, a hydraulic motor attached to the bracket comprising a cylinder and a piston means having a rod extending therefrom, there being provided a track on the frame and a shoe slidable therein connected to the rod, and a link for connecting the work plate to the shoe including at one end an arm pivoted in the work plate and at another end a portion pivoted to the shoe adapted to swing the work plate to and away from the broach in response to operation of the motor.

5. In a work feeding mechanism for a broaching machine having a broaching member, a supporting frame therefor, a bracket attached to the frame and a horizontal shelf member attached to the bracket, the combination of a polygonal work plate for carrying a work piece to and away from the broaching member pivotally mounted at one corner thereof upon the shelf member and slidable thereover to present one side of said plate to the broaching member, a hydraulic motor attached to the bracket comprising a cylinder and piston means having a rod extending therefrom, there being provided a track on the bracket having a shoe slidable therein connected to the rod, and a link for connecting the work plate to the shoe including an arm pivoted in the work plate and a recessed portion pivoted to the shoe in order to swing the work plate to and away from the broaching member in response to reciprocatory operation of the motor, there being also provided an arcuate slot in the table member to permit the pivot arm on the link to swing through it in an arcuate path.

6. A work feeding mechanism for a multiple broaching machine equipped with a plurality of broaches mounted on a frame comprising a plurality of work plates for carrying the work to and away from the broaches, each pivotally mounted upon the frame, a power means attached to the frame having a reciprocating member extending therefrom, a plurality of reciprocating elements slidably secured to the frame connected respectively with the reciprocating member and with corresponding work plates for shifting the work plates to and away from the broaches in response to operation of the power means.

7. A work feeding mechanism for a multiple broaching machine equipped with a plurality of broaches mounted on a frame comprising a plurality of work plates for carrying the work to and away from the broaches each pivotally mounted upon the frame, a hydraulic motor attached to the frame having a reciprocating member extending therefrom, there being a plurality of tracks on the frame and an element slidably secured in each attached respectively to the reciprocating member, and a plurality of links each pivoted at one end to its respective work plate and having another end pivoted to its respective slidable element and operable thereby to alternately swing the work plates to and away from the broaches in response to operation of the motor.

8. A work feeding mechanism for a duplex broaching machine equipped with a pair of broaches comprising a frame having a shelf thereon, a pair of work plates for carrying work pieces to and away from the broaches, each pivotally mounted near one edge thereof upon the shelf and slidable thereover to present one side of the plate to the broach, a single hydraulic motor attached to a portion of the frame comprising cylinder and piston elements, one of said elements being movable and having an extension thereon, there being a pair of tracks on the frame and a shoe slidably secured in each attached respectively to the extension, and a link for connecting each work plate to its respective shoe, each link comprising an arm pivotally connected to its respective work plate and having an end pivoted to its respective shoe in order that the work plates may be swung alternately into broaching position and into loading position in response to operation of the motor, there being also provided arcuate slots in the shelf to permit the pivot arms to swing therethrough.

9. In a broaching machine having a column with a broaching member mounted thereon, a bracket attached to the column and a shelf portion attached to the bracket with one free edge adjacent the broach, a work supporting plate having a flat side slidable upon the shelf portion and pivoted thereto and adapted to be supported by the shelf portion during a broaching operation, and means positioned adjacent the shelf portion on a side thereof opposite the work supporting plate having an attachment to the work plate for swinging said plate about its pivot to and away from a broaching position.

10. In a broaching machine having a column with a broaching ram carrying a broach mounted thereon, the combination of a work feeding mechanism comprising a bracket attached to the column at the side adjacent the broach, a shelf like table portion surmounting the bracket with one free edge facing the broach, a work supporting plate lying upon the table portion and pivoted thereto, and adapted to be supported by the table portion during a broaching operation, and means lying below the table portion having an attachment to the work supporting plate for swinging said plate alternately about its pivot into a broaching position adjacent the broach and away from said broach to a loading position, there being provided an arcuate aperture through the table portion to allow movement of the attachment when the work plate is being positioned.

11. In a broaching machine having a frame and a broach mounted thereon, a work feeding mechanism comprising a collapsible triangular leverage system including a work support and a link pivoted thereto, said work support and said link having each a second pivot point forming between said second points and the first pivot connection two legs of constant length for the triangular system, a power means and a reciprocating element connected therewith slidably secured to the frame having a line of reciprocation passing through the second pivot points constituting a third leg of variable length for the triangular system, one of said second pivot points being connected to the frame and the other to an end of the reciprocating element, said element being alternately retractable and extendible by operation of the power means to alternately erect and collapse the triangular system and thereby shift the work support between loading and broaching positions.

12. In a broaching machine having a frame and a broach mounted thereon, a work feeding mechanism comprising a positive stop on the frame, a collapsible triangular leverage system including a work support having a fixed pivot securing it to the frame and a movable pivot thereon forming one leg therebetween of constant length for the triangular system, a power operated reciprocating element slidably secured to the frame having its line of reciprocation in a position passing through the fixed pivot and having a movable pivot at one end forming thereby an adjacent leg of variable length for the triangular system, and a link secured between the movable pivots forming a third leg of constant length for the triangular system, said variable leg being retractable to erect the system and shift the support to a position against the stop for a broaching operation wherein said link is used as a columnar brace, and extendible to collapse the system and shift the support to a loading position.

13. A work feeding mechanism for a multiple broaching machine equipped with a plurality of broaches mounted on a frame comprising a plurality of work plates for carrying the work to and away from the broaches, each pivotally mounted upon the frame, a power means attached to the frame having a reciprocating member extending therefrom, and a plurality of reciprocating elements slidably secured to the frame connected respectively with the reciprocating member and with corresponding work plates for shifting one work plate to and away from its respective broach, while an adjacent work plate is being shifted alternately away from and to its respective broach in response to operation of the power means.

14. In a machine tool having a frame and a tool supporting member mounted thereon, a work feeding mechanism comprising a work plate pivotally mounted upon the frame and slidably supported thereby, a power means attached to the frame having a reciprocating member extending therefrom, and a reciprocating element slidably secured to the frame connected with the reciprocating member and with the work plate and operable thereby to communicate motion from the power means to the work plate in order to translate said work plate to and away from a tooling position.

15. In a machine tool having a frame and a tool supporting member mounted thereon, a work feeding mechanism comprising a horizontal shelf member supported by the frame, a work plate pivotally mounted upon the shelf member and slidable over the surface of said member to present an edge of said plate to the tool supporting member, a hydraulic motor attached to the frame comprising cylinder and piston elements, a rod attached to one of said elements, there being provided a track on the frame having a shoe slidable therein connected to the rod, and a link having one end pivotally attached to the work plate and another end pivotally attached to the shoe for swinging said plate to and away from the tool supporting member in response to operation of the motor.

16. A work feeding mechanism for a machine tool equipped with a plurality of tool supporting members mounted on a frame comprising a plurality of work plates for carrying the work to and away from the tool supporting members, each pivotally mounted upon the frame, a power means attached to the frame having a reciprocating member extending therefrom, there being a plurality of reciprocating elements slidably secured to the frame connected respectively with the reciprocating member and with corresponding work plates for shifting the work plates to and away from the tool supporting members in response to operation of the power means.

17. In a broaching machine having a broaching ram and a supporting frame therefor, a work feeding mechanism comprising a work supporting member pivotally mounted upon the frame for swinging movement in a plane at right angles to the stroke of the broaching ram for presenting a work piece to and withdrawing it from the ram, reciprocatory power means supported by the frame, a track on the frame disposed opposite the broaching ram, a shoe slidable on the track and connected to the power means to be reciprocated thereby, and a link having one end pivotally attached to the work supporting member and the other end pivotally attached to said shoe for swinging said work supporting member to and away from the broaching ram in response to operation of said power means, said link being attached to the work supporting member remote from its pivotal connection to the frame and adapted to assume a position substantially at right angles with respect to the broaching ram when the work supporting member is swung to present a work piece to the broaching ram.

18. In a broaching machine having a broaching ram and a supporting frame therefor, a work feeding mechanism comprising a work supporting member pivotally mounted on the frame to be swung toward and away from the broaching ram to present or withdraw a work piece to and from the ram, power means mounted on the frame and toggle means connecting said power means and said work supporting member for swinging the work supporting member, said toggle means assuming a substantially locked position when the work supporting member is in position presenting a work piece to the broaching ram.

FRANCIS J. LAPOINTE.